United States Patent
Roberts

(10) Patent No.: US 8,200,160 B2
(45) Date of Patent: Jun. 12, 2012

(54) PROCESS FOR ELIMINATING INTERFERENCES IN A HSDPA MOBILE TERMINAL

(75) Inventor: Michael Roberts, Neuilly sur Seine (FR)

(73) Assignee: NEC Corporation, Tokyo (JP)

( * ) Notice: Subject to any disclaimer, the term of this patent is extended or adjusted under 35 U.S.C. 154(b) by 1027 days.

(21) Appl. No.: 12/092,203

(22) PCT Filed: Nov. 2, 2006

(86) PCT No.: PCT/JP2006/322424
§ 371 (c)(1),
(2), (4) Date: May 20, 2008

(87) PCT Pub. No.: WO2007/055300
PCT Pub. Date: May 18, 2007

(65) Prior Publication Data
US 2009/0068952 A1 Mar. 12, 2009

(30) Foreign Application Priority Data
Nov. 8, 2005 (FR) ...................................... 05 53379

(51) Int. Cl.
*H04B 1/00* (2006.01)
*H04B 15/00* (2006.01)
(52) U.S. Cl. .................. 455/63.1; 455/67.11; 455/67.13; 455/68; 455/69; 455/296; 375/147; 375/148; 375/346
(58) Field of Classification Search .................. 455/63.1, 455/67.11, 67.13, 68–69, 522, 561, 295–296; 375/144, 147–150, 346; 370/317–318
See application file for complete search history.

(56) References Cited

U.S. PATENT DOCUMENTS

| | | | | |
|---|---|---|---|---|
| 5,649,303 A * | 7/1997 | Hess et al. | .................... | 455/63.3 |
| 6,868,277 B1 * | 3/2005 | Cerwall et al. | ................ | 455/509 |
| 7,012,971 B2 * | 3/2006 | Chen et al. | ..................... | 375/316 |
| 7,209,515 B2 * | 4/2007 | Kilfoyle et al. | ............... | 375/152 |
| 7,636,573 B2 * | 12/2009 | Walton et al. | ................. | 455/454 |
| 7,751,843 B2 * | 7/2010 | Butala | ........................... | 455/522 |
| 7,787,518 B2 * | 8/2010 | Narayan et al. | .............. | 375/144 |

FOREIGN PATENT DOCUMENTS

| | | |
|---|---|---|
| JP | 2002-185365 | 6/2002 |
| JP | 2004-289758 | 10/2004 |
| JP | 2006-513639 | 4/2006 |
| WO | WO 00/18029 | * 3/2000 |

OTHER PUBLICATIONS

Abstract of International Publication No. WO 2004/064270 A1 dated Jul. 29, 2004.

* cited by examiner

*Primary Examiner* — Tuan A Tran
(74) *Attorney, Agent, or Firm* — Scully, Scott, Murphy & Presser, P.C.

(57) ABSTRACT

Process of elimination of interferences in a downlink transmission channel between a mobile terminal comprising the resources to receive HSDFA and MBMS service and a base station of a cellular telecommunications network.
The process according to the invention comprises the following steps:
the network informs the terminal of a list of channels liable to generate interferences on the aforementioned downlink transmission channel,
the terminal determines among the aforementioned list the channel that is generating the highest level of interferences and uses the signal of the aforementioned channel to eliminate the aforementioned interferences.

3 Claims, 1 Drawing Sheet

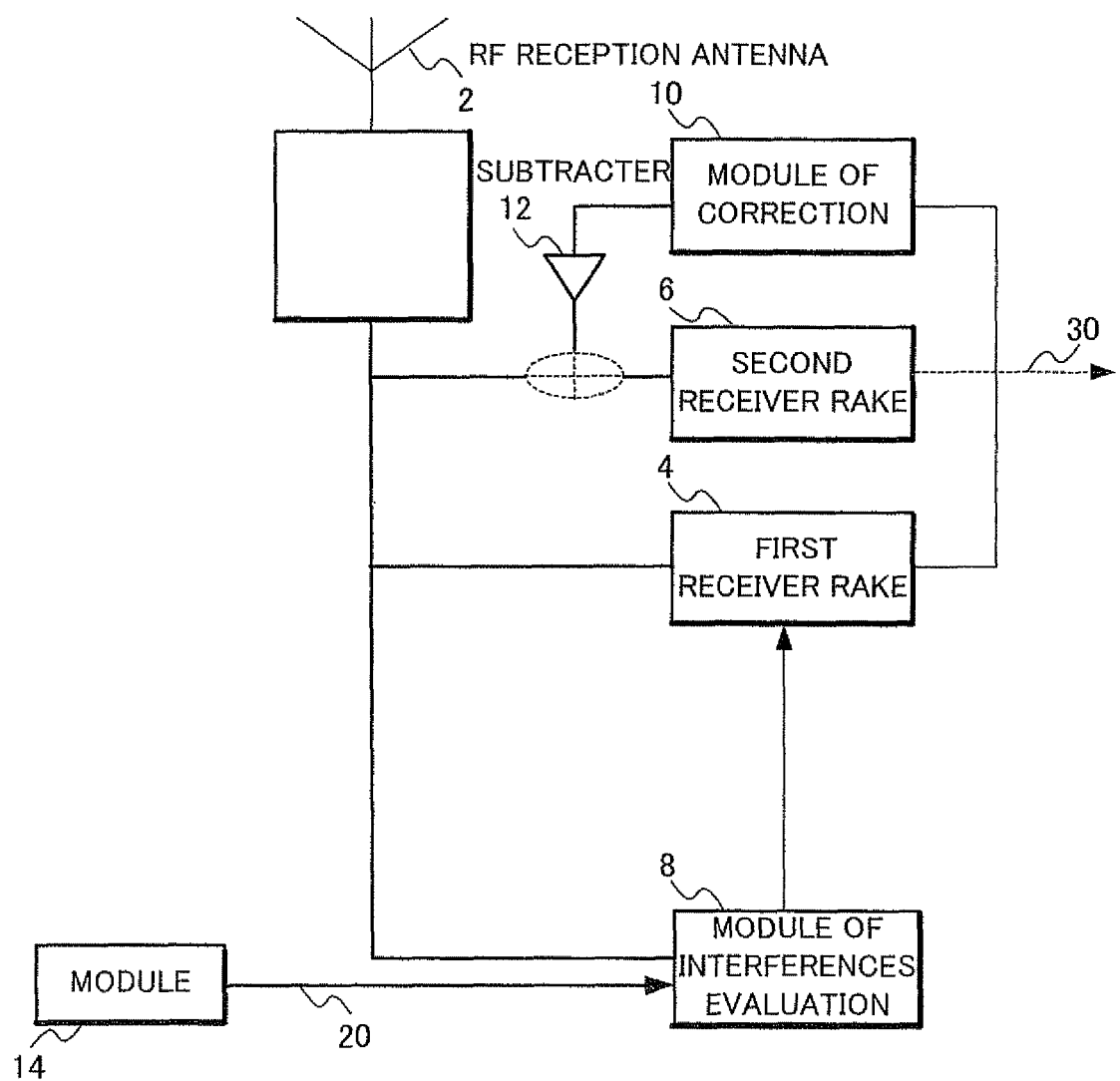

PROCESS FOR ELIMINATING INTERFERENCES IN A HSDPA MOBILE TERMINAL

TECHNICAL FIELD

The invention is in the field of telecommunications and relates, more specifically, to a process for eliminating interferences in a mobile terminal comprising the resources to receive the HSDPA and MBMS services through a cellular telecommunications network.

The invention also relates to a mobile terminal comprising the resources to receive HSDFA and MEMS services.

BACKGROUND ART

In UMTS, the radio interface between a terminal and the radio access network (UTRAN, for Universal Terrestrial Radio operator Network accesses) comprises three principal layers of protocol:
  the physical layer (layer 1),
  the link layer (layer 2),
  the layer of radio resource control (RRC, for Radio Resource Control).

Layer RRC is charged to manage the signal between the UTRAN and the mobiles, and the configuration of the resources for layers 1 and 2 of protocol on the Radio interface. It also provides messages of the signalization to the non-accesses stratum.

The UTRAN offers a great flexibility in the management of the radio resource. It results in the level of protocol RRC by various states of services which depend on the level of activity of the mobile concerned. The guiding principle consists in constantly adapting the allocation of radio resources to a mobile according to its requirements in traffic.

Protocol RRC can be in two modes: the standby mode (Idle mode) in which the mobile is switched on, but there is no RRC connection between the mobile and the UTRAN, and the connected mode in which the mobile has established a RRC connection with the UTRAN. The connected mode is subdivided in four major states: CELL_DCH, CELL_FACH, CELL_PCH and URA_PCH.

The state CELL_DCH is characterized by the allocation of radio resources dedicated to one or more transfer channels of the DCH (for Dedicated Channel) type to the mobile. The dedicated resources are allocated for traffic of the real time type or for the transfer of a large quantity of data.

In the state CELL_FACH, no dedicated radio resource is allocated to the mobile. In this state, it is the common channels of transport (RACH, FACH, CPCH are Random Access Channel, Forward Access Channel and Common Packet Channel respectively) that are used for the transfers between the terminal and the network. The state CELL_FACH is adapted for the transfer of data of small size without constraint of real time.

The states CELL_PCH and URA_PCH are the pause states of protocol RRC in connected mode. The transition towards these states is ordered by the network after, for example, the report of the prolonged absence of traffic user. In these states, the mobile is in mode of discontinuous reception (DRX for discontinuous receptions, its principal activity consisting of the monitoring the channel of paging and the management of its mobility in the UTRAN. Before all resumption of traffic user, RRC must pass by again the state CELL_FACH and carry out an update of localization in the UTRAN.

Indeed, in state CELL_PCH or URA_PCH, when downlink traffic user is presented at the UTRAN, it sends a message of paging to the mobile in order for the user to move to state CELL_FACH for the resumption of the traffic. The mobile then moves to state CELL_FACH and carries out a procedure of update of localization (Cell Update) by the same reasons, the response to a paging, after which the traffic user will be able to restart.

For uplink traffic, the layer RRC of the mobile moves to the state CEL_FACH, starts a procedure of Cell Update, by the same reasons, the resumption of traffic on the uplink line, and with the successful completion of this procedure, the traffic restarts.

The specifications of RAN WG (Release 5) group of the 3GPP (for third Generation Partnership Group) define HSDPA (High Speed Downlink Packet Access) technology which allows a transfer of high flow rate of data through the network towards the terminal by assigning 500 times a second the resources of each channel to the various users. This operation is carried out during the intervals of time between two packages, according to the modulation and of the flow determined by the adaptation of the radio link.

In addition, the specifications 3GPP (release 6) groups integrate MEMS (Multi-Broadcast/Multicast Service) services into the standard 3G in order to ensure the diffusion of the same contents to several addresses. Initially, the reception by a terminal of diffused MBMS services was envisaged only when the terminal is in state IDLE, CELL_PCH, URA_PCH and CELL_FACH. It was then planned to allow the reception of these services in state CELL_DCH when the HSDPA chain of reception was not used simultaneously, i.e. when in this state only the R99 DCH chain of reception is used. In addition, MBMS resources make it possible for the terminal to receive other downlink channels in the cell in which the mobile terminal is situated. The channels used for the transmission of MBMS services are static and are used for long time to transmit various types of data. These data are received systematically by all the terminals being in the zone of diffusion.

However, a user of a terminal being in this zone may not be concerned by the diffused data.

In addition, the introduction of the new HSDPA technology led the groups 3GPP to define new resources such as a new control channel (F-DPCCH) new signal carrier on HSDPA channels and the transmission of the voice. The probability so that the HSDPA chain of reception is automatically allocated to the terminal when it is in state CELL_DCH is large. Diffused HSPDA channels generate strong interferences with the specific signals received by the user terminal through a downlink channel on a cell of the network.

Normally, HSDPA channels are allocated and not allocated dynamically to the terminal in a cell. The signal associated with these channels is transmitted to the terminal via dedicated channels. This signal generates an important load on the level of the terminal and reduces its capacity of emission/reception.

It is thus desirable to limit this load in order to improve quality of reception by the terminal of the signals specific to the user.

An object of the invention is to make it possible for the terminal to release the resources initially used for the reception of MBMS data, and to use the released resources for the reception of its own data in state CELL_FACH as well as in state CELL_DCH in order to improve quality of reception of the terminal in these states.

Another object of the invention is to make it possible for the terminals to use HSPDA and MBMS resources to eliminate the interferences affecting the specific signals to the user.

SUMMARY

The invention recommends a process of elimination of interferences in a downlink transmission channel between a mobile terminal comprising the resources to receive services HSDPA and MBMS and a base station of a cellular telecommunications network.

The process according to the invention comprises the following steps:

the network informs the terminal of a list of channels liable to generate interferences on the aforementioned downlink transmission channel, the terminal determines among the aforementioned list the channel generating the highest level of interferences and uses the signal of the aforementioned channel to eliminate the aforementioned interferences.

Preferentially, the network transmits the aforementioned list to the terminal via the channels dedicated to HSDPA and MBMS services.

According to another characteristic of the invention, the terminal periodically measures the level of interference, compares the measured level with a predetermined threshold value, and, if the measured level is lower than the aforementioned threshold value, determines again the channel generating the highest level of interferences in order to take account of its geographical position in the network.

The invention also relates to a mobile terminal comprising the resources to receive HSDPA and MBMS diffused services in the cellular telecommunications network.

According to the invention, the aforementioned HSDPA and MEMS resources are adapted to eliminate the interferences that are generated at the level of the terminal on the downlink transmission channel.

According to the invention, the terminal comprises:

means to measure periodically the level of interference, means to compare the measured level with a predetermined threshold value and, means to re-determine the channel generating the highest level of interferences in order to take account of the geographical position of the terminal in the network if the measured level is lower than the aforementioned threshold value.

BRIEF DESCRIPTION OF THE DRAWINGS

Other characteristics and advantages of the invention will arise from the description which will follow, taken as nonrestrictive example, in reference to the annexed FIGURE schematically illustrating a chain of reception of a HSDPA terminal in which the process according to the invention is implemented.

EXEMPLARY EMBODIMENT

The description which follows relates to a particular example of implementation of the process according to the invention in a mobile terminal provided with resources to receive HSDPA and MEMS service.

Let us remember that in a CDMA channel, all the users use the same frequency band and are identified by codes. In UMTS, one affects only one code by mobile, which means that the resources of this channel are used by only one user, whereas HSDPA technology makes it possible to allocate up to 14 codes per mobile so that all the resources of a channel are shared and allocated dynamically according to the needs for each one with a transmission flow rate which can reach 8-10 Mbps on a frequency band of 5 MHz in WCDMA downlink. This increase in the flow rate results from the fact that contrary to 1' UMTS which uses the QPSK modulation, which transports 2 bits of information by "symbol" (or baud), the HSDPA makes in more use of the 16QAM modulation, which conveys 4 bits per symbol. Moreover, in UMTS, it passes between 10 and 20 milliseconds between the sending of two packages, whereas in HSDPA, this interval is reduced to 2 milliseconds from where an acceleration of the traffic. In addition, in WCDMA, the base station plays on the emission power to keep a constant quality, while in HSDPA technology the base station permanently adapts the flow rate to the conditions of transmission. HSPDA technology introduces moreover a new mechanism of payment of the packages, Indeed, in general, when an erroneous package arrives, the receiver crushes it and requires its re-emission. In HSDPA, one asks also for its re-emission, but one keeps it in memory. Being based on the principle, when an incorrect package arrives, the followings risks to be the same. The object is to reconstitute an error-free package with the fragments of several erroneous packages.

FIG. 1 schematically illustrates the reception chain of a HSDPA terminal comprising a RF reception antenna 2 connected, on the one hand, to a first receiver rake 4 and a second receiver rake 6, and on the other hand, to a module 8 of interference evaluation. The first receiver rake 4 is connected to a module of correction 10 which communicates, via a subtracter 12, with the input of the second receiver rake 6. Module 8 of interference evaluation is connected to module 14 of reception of HSPDA and MBMS services.

In operation, in a given cell of the network, in addition to the specific data of the user, the terminal receives via the signal transporting module 14 of the signals for example of HSPDA or MBMS services. In parallel, the network transmits (arrow 20) to the terminal a list comprising the codes of the channels liable to generate interferences on the aforementioned downlink transmission channel. With the reception of this list, module 8 of interference evaluation determines among the aforementioned list the channel generating the highest level of interferences and transmits the code of this channel to the first receiver rake 4. The signal received via the most interfering channel is transmitted to the module of correction 10. The latter assigns to the received signal a coefficient of correction and transmits this signal to the second receiver rake 6 via a subtracter 12. The second receiver rake 6 delivers (arrow 30) an output signal in which the interfering signal defined by the module 8 of interference evaluation was cut off.

In order to take account of the geographical position of the terminal in the network, the module of interferences evaluation 8 periodically measures the level of interference, compares the measured level with a predetermined threshold value, and re-determines the channel that is generating the highest level of interferences if the terminal is in a new position in the network in which the measured level is lower than the aforementioned threshold value.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from French patent application No. 0553379, filed on Nov. 8, 2005, the disclosure of which is incorporated herein in its entirety by reference.

The invention claimed is:

1. A method of eliminating interference in a downlink transmission channel between a mobile terminal having resources for receiving HSDPA and MBMS services and a base station of a cellular telecommunications network, the method comprising:
   receiving, from the base station at the mobile terminal, a list of channels liable to generate interference on said downlink transmission channel;
   determining, from said list which channel is generating the highest level of interference
   using a signal of said determined channel to eliminate said interference;
   measuring, by the mobile terminal, periodically a level of interference;
   comparing the measured level with a predetermined threshold value; and
   determining again which channel is generating the highest level of interference if the measured level is less than said predetermined threshold value, in order to take account of the mobile terminal's geographical position in the cellular telecommunications network.

2. A method according to claim 1, wherein the mobile terminal receives said list from the base station via the channels dedicated to the HSDPA and MBMS services.

3. A mobile terminal including resources for receiving HSDPA and MBMS services broadcast in a cellular telecommunications network, the terminal being characterized in that said HSDPA and MBMS resources are adapted to eliminate the interference generated at the terminal on the down transmission channel, the terminal comprising:
   means for determining the channel generating the highest level of interference from the channels in a list supplied by the network;
   means for periodically measuring the level of interference;
   means for comparing the measured level with a predetermined threshold value; and
   means for again determining which channel is generating the highest level of interference if the measured level is less than said predetermined threshold value, and if the terminal changes position in the network.

* * * * *